United States Patent
Patton, III et al.

(10) Patent No.: US 6,876,508 B1
(45) Date of Patent: Apr. 5, 2005

(54) DISK DRIVE COMPRISING CONTROL CIRCUITRY POWERED BY A SECONDARY VOLTAGE SUPPLIED BY A CENTER TAP OF A SPINDLE MOTOR DURING A NORMAL OPERATING MODE

(75) Inventors: Charles R. Patton, III, Murrieta, CA (US); George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 85 days.

(21) Appl. No.: 10/209,734

(22) Filed: Jul. 31, 2002

(51) Int. Cl.[7] .............................................. G11B 15/46
(52) U.S. Cl. ........................ 360/73.03; 360/75; 360/70
(58) Field of Search ............... 360/69–71, 73.01–73.03, 360/75; 318/459–500, 376–377, 254, 560; 310/67 R, 189; 388/928.1

(56) References Cited

U.S. PATENT DOCUMENTS

| | | | | |
|---|---|---|---|---|
| 5,210,474 A | * | 5/1993 | Oswald | 318/254 |
| 5,223,771 A | * | 6/1993 | Chari | 318/254 |
| 5,616,993 A | * | 4/1997 | Lu et al. | 318/254 |
| 5,737,144 A | | 4/1998 | Ataee et al. | |
| 5,866,998 A | * | 2/1999 | Menegoli | 318/254 |
| 5,889,629 A | | 3/1999 | Patton, III | |
| 6,163,120 A | * | 12/2000 | Menegoli | 318/254 |

FOREIGN PATENT DOCUMENTS

EP          1003273 A2 * 5/2000 .......... H02M/3/155

* cited by examiner

*Primary Examiner*—Sinh Tran
*Assistant Examiner*—Jason Olson
(74) *Attorney, Agent, or Firm*—Milad G. Shara, Esq.; Howard H. Sheerin, Esq.

(57) ABSTRACT

A disk drive is disclosed comprising an interface for receiving a supply voltage from a host computer and control circuitry for controlling at least one operation of the disk drive. The supply voltage is applied to the windings of a multi-phase spindle motor in a commutation sequence during a normal operating mode, and a secondary voltage supplied by a center tap of the windings is used to power the control circuitry during the normal operating mode.

14 Claims, 7 Drawing Sheets

|  | $\phi_A$ | $\phi_B$ | $\phi_C$ |
|---|---|---|---|
| t0.5 | H | L | X |
| t1.5 | H | X | L |
| t2.5 | X | H | L |
| t3.5 | L | H | X |
| t4.5 | L | X | H |
| t5.5 | X | L | H |

FIG. 5B

|  | $\phi_A$ | $\phi_B$ | $\phi_C$ |
|---|---|---|---|
| t0.5 | H | L | X |
| t1.5 | H | X | L |
| t2.5 | X | H | L |
| t3.5 | L | H | X |
| t4.5 | L | X | H |
| t5.5 | X | L | H |

DISK DRIVE COMPRISING CONTROL CIRCUITRY POWERED BY A SECONDARY VOLTAGE SUPPLIED BY A CENTER TAP OF A SPINDLE MOTOR DURING A NORMAL OPERATING MODE

CROSS REFERENCE TO RELATED APPLICATIONS AND PATENTS

This application is related to co-pending U.S. patent application Ser. No. 09/552,400 entitled "DISK DRIVE COMPRISING SPIN DOWN CIRCUITRY HAVING A POWER CLAMP CIRCUIT FOR ENHANCING POWER AND BRAKING CONTROL" filed on Apr. 19, 2000, and to co-pending U.S. patent application Ser. No. 10/210,396 entitled "DISK DRIVE COMPRISING A MULTI-PHASE SPINDLE MOTOR HAVING A CENTER TAP CONNECTABLE TO A SECONDARY SUPPLY VOLTAGE" filed on Jul. 31, 2002, the disclosures of which are incorporated herein by reference.

BACKGROUND OF THE INVENTION

1. Field of the Invention

The present invention relates to disk drives for computer systems. More particularly, the present invention relates to a disk drive comprising control circuitry powered by a secondary voltage supplied by a center tap of a spindle motor during a normal operating mode.

2. Description of the Prior Art

Disk drives typically employ a multi-phase spindle motor (e.g., a three phase spindle motor) for spinning a disk while a head writes data to and reads data from the disk. The head is connected to a distal end of an actuator arm which is rotated about a pivot by a voice coil motor (VCM) in order to actuate the head radially over the disk to access radially spaced, concentric tracks. The disk drive receives power from a host computer, including a 12V supply for powering the spindle motor and VCM, and a 5V supply for powering the control circuitry for controlling the operation of the disk drive. Requiring the host computer to provide two supply voltages can increase the cost of the host computer in certain applications, such as mobile devices, set top boxes, game systems, etc., which may operate on a single supply voltage.

There is, therefore, a need to reduce the cost of supplying two supply voltages to a disk drive while maintaining adequate spindle motor and VCM performance.

SUMMARY OF THE INVENTION

The present invention may be regarded as a disk drive comprising a disk having a plurality of tracks, a head, a voice coil motor for actuating the head radially over the disk, and an interface for receiving a supply voltage from a host computer. The disk drive further comprises a multiphase spindle motor for rotating the disk, the multi-phase spindle motor comprising a plurality of windings, each winding comprising a first end and a second end, the second ends connected together at a center tap. A spindle driver, responsive to the supply voltage, commutates the windings over commutation intervals during a normal operating mode. The disk drive further comprises control circuitry for controlling at least one operation of the disk drive. A secondary voltage is supplied by the center tap of the windings, and the control circuitry is powered by the secondary voltage during the normal operating mode.

In one embodiment, the disk drive further comprises a voltage regulator for regulating the secondary voltage used to power the control circuitry during the normal operating mode.

In one embodiment, the windings are wound to control the secondary voltage supplied by the center tap of the windings.

In another embodiment, the disk drive comprises a switch for connecting the center tap voltage to the voltage regulator, wherein the switch is modulated to control the secondary voltage supplied by the center tap of the windings.

In still another embodiment, the spindle driver connects the first end of a first one of the windings and the first end of a second one of the windings to ground for at least part of a commutation interval in order to control the secondary voltage supplied by the center tap of the windings. In one embodiment, the interval that the first end of the second one of the windings is connected to ground varies in order to control the amount of current drawn from the supply voltage through the center tap of the windings. In another embodiment, the spindle driver is responsive to a modulation signal for modulating the connection of the first end of the second one of the windings to ground for at least part of the commutation interval in order to control the secondary voltage supplied by the center tap of the windings.

The present invention may also be regarded as a method of operating a disk drive, the disk drive comprising a disk having a plurality of tracks, a head, a voice coil motor for actuating the head radially over the disk, an interface for receiving a supply voltage from a host computer, control circuitry for controlling at least one operation of the disk drive, and a multi-phase spindle motor for rotating the disk. The multi-phase spindle motor comprises a plurality of windings, each winding comprising a first end and a second end, the second ends connected together at a center tap. The windings are commutated over commutation intervals in response to the supply voltage during a normal operating mode, a secondary voltage is generated from the center tap of the windings, and the secondary voltage is used to power the control circuitry during the normal operating mode.

DESCRIPTION OF THE PREFERRED EMBODIMENTS

Figure 1:
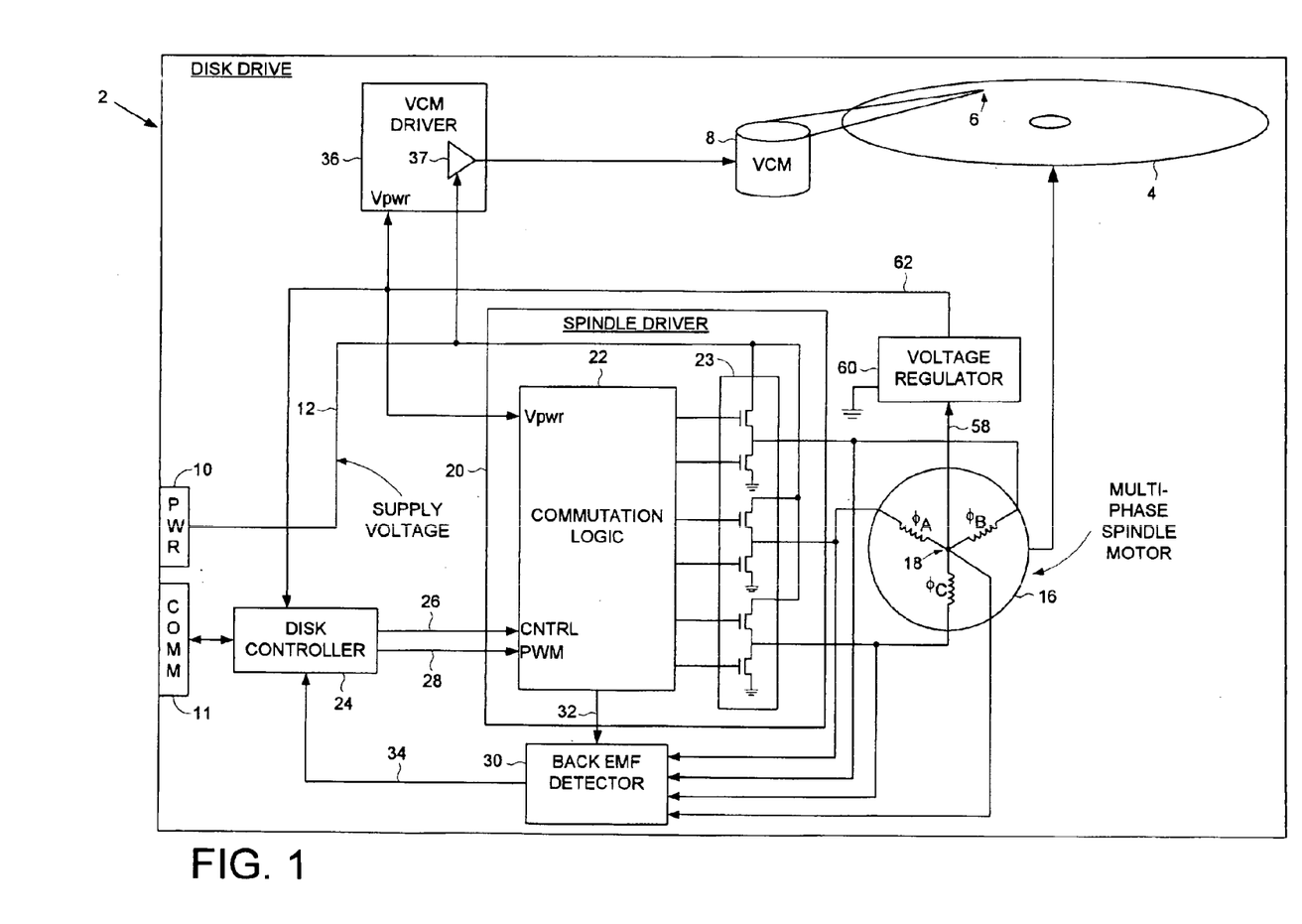
FIG. 1 shows a disk drive according to an embodiment of the present invention wherein the secondary supply voltage of a prior art disk drive is eliminated to reduce cost, and a secondary voltage supplied by the center tap of the spindle motor is used to power control circuitry in the disk drive (e.g., a disk controller).

FIG. 1 shows a disk drive 2 according to an embodiment of the present invention comprising a disk 4 having a plurality of tracks, a head 6, a voice coil motor 8 for actuating the head 6 radially over the disk 4, and an interface 10 for receiving a supply voltage 12 from a host computer. The disk drive 2 further comprises a multi-phase spindle motor 16 for rotating the disk 4, the multi-phase spindle motor 16 comprising a plurality of windings (e.g., φA, φB, φC), each winding comprising a first end and a second end, the second ends connected together at a center tap 18. A spindle driver 20, responsive to the supply voltage 12, commutates the windings over commutation intervals during a normal operating mode of the disk drive 2. The disk drive 2 further comprises control circuitry (e.g., a disk controller 24) for controlling at least one operation of the disk drive 2. A secondary voltage 58 is supplied by the center tap 18 of the windings, and the control circuitry is powered by the secondary voltage 58 during the normal operating mode.

In the embodiment of FIG. 1, a voltage regulator 60 regulates the secondary voltage 58 to generate a regulated voltage 62 used to power the control circuitry (e.g., the disk controller 24, spindle driver 20, VCM driver 36, etc.). Any suitable voltage regulation method may be employed, including the use of a conventional "series-pass" voltage regulator.

In the embodiment of FIG. 1, the spindle motor 16 comprises three windings (φA, φB, φC) corresponding to three phases. However, any suitable number of windings may be employed to implement any suitable multi-phase spindle motor. Further, any suitable commutation sequence may be employed to commutate the windings. In the embodiment of FIG. 1, the spindle driver 20 comprises commutation logic 22 for controlling switches 23 to commutate the windings of the spindle motor 16 in a two-phase, three-phase, or hybrid two-phase/three-phase mode as described below with reference to FIG. 5A–5B.

The disk controller 24 communicates with the host computer over interface 11 and executes various operations (e.g., servo control, read/write channel, etc.) to perform read and write commands. The disk controller 24 generates a control signal 26 and a pulse width modulated (PWM) signal 28 applied to the spindle driver 22. The control signal 26 comprises control information (such as a starting state and a commutation clock), and the PWM signal 28 is used to modulate the driving current in the windings. The windings are connected to a back EMF detector 30 which detects threshold crossings (e.g., zero crossings) in the back EMF voltage generated by the windings with respect to the center tap 18. Since the back EMF voltage is distorted when current is flowing, the spindle driver 20 supplies a control signal 32 to the back EMF detector 30 identifying the "open" winding generating a valid back EMF signal. At each back EMF threshold crossing the back EMF detector 30 toggles a signal to generate a square wave signal 34. The frequency of the back EMF threshold crossings and thus the frequency of the square wave signal 34 represent the speed of the spindle motor 16. In an alternative embodiment, the spindle driver 20 comprises suitable circuitry for generating the PWM signal internally in response to a speed error signal generated by the disk controller 24. The spindle driver 20 may sense the current flowing through the windings of the spindle motor 16 and use current feedback to generate the PWM signal.

The disk controller 24 evaluates the square wave signal 34 and adjusts the PWM signal 28 in order to control the speed of the spindle motor 16. The disk controller 24 may be implemented as a single integrated circuit or multiple integrated circuits and may include a servo control microprocessor and a disk control microprocessor. Alternatively, the disk controller 24 may comprise a single microprocessor for performing disk, servo, and host interface operations.

The disk drive 2 of FIG. 1 further comprises a voice coil motor (VCM) driver 36 responsive to the supply voltage 12 received from the host computer and the regulated voltage 62 generated by the voltage regulator 60 in response to the secondary voltage 58. The VCM driver 36 applies the supply voltage 12 to the voice coil motor 8 through driver 37 either in a linear power amplifier mode or in a modulated sequence (e.g., PWM) to control the speed of the voice coil motor 8 while actuating the head 6 radially over the disk 4. The regulated voltage 62 powers control circuitry within the VCM driver 36.

Figure 2A:
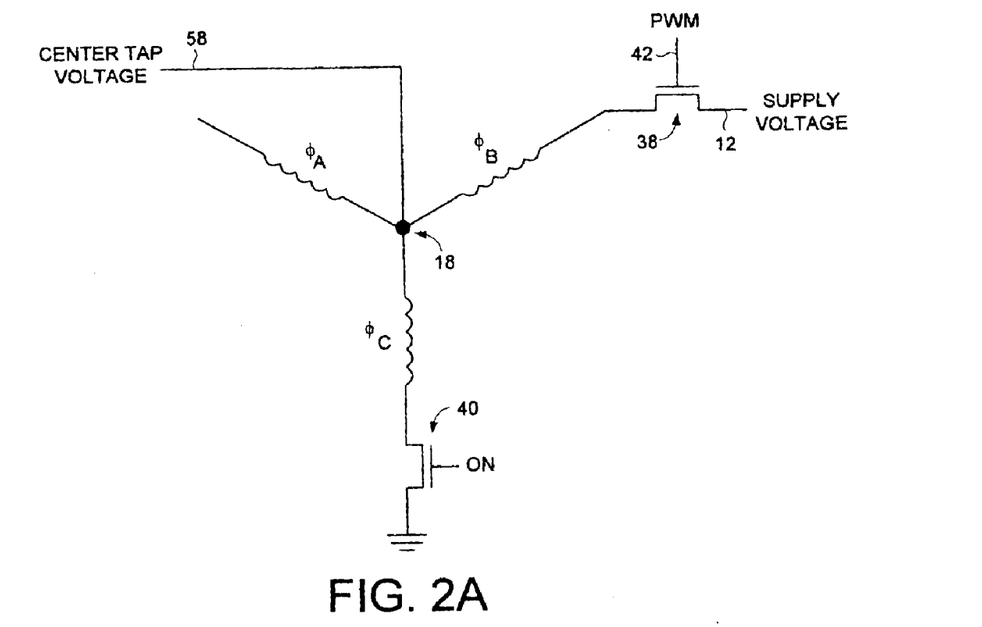
FIG. 2A shows a spindle motor configuration according to an embodiment of the present invention wherein the windings are wound to control the secondary voltage supplied by the center tap of the windings.

Referring to FIG. 2A, in one embodiment the windings (φA, φB, φC) in the spindle motor 16 are wound to control the secondary voltage 58 supplied by the center tap 18 of the windings. FIG. 2A shows a state in the commutation sequence wherein the first end of winding φB is connected to the supply voltage 12 through switch 38 and the first end of winding φC is connected to ground through switch 40. Switch 38 is pulse width modulated by PWM signal 42 in order to control the amount of current drawn from the supply voltage 12. When switch 38 is on, the commutation sequence is controlled relative to the back EMF voltage in the windings such that the voltage drop across each winding φB and φC is half the supply voltage 12 (the windings φB and φC are connected in series during the commutation interval shown). The windings (φA, φB, φC) are wound to select the desired resistance for the windings (φA, φB, φC) and thereby control the secondary voltage 58 supplied by the center tap 18 of the windings (as described below with reference to FIG. 2E).

Figure 2B:
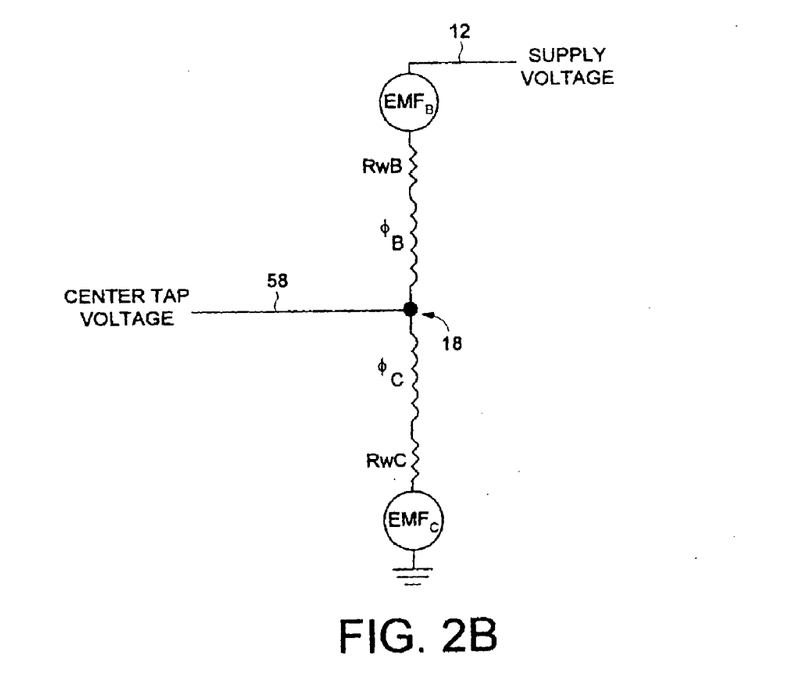
FIG. 2B shows an equivalent circuit for FIG. 2A including the resistance of each winding RwB and RwC as well as the back EMF voltages across each winding.

FIG. 2B shows an equivalent circuit for FIG. 2A including the resistance of each winding RwB and RwC as well as the back EMF voltages ($EMF_B$ and $EMF_C$) across each winding. Defining a winding factor Wf proportional to the number of turns of copper wire in each of the windings leads to the following relationships for a fixed cross-section coil in the slots of the motor:

$Rw=Rw_0*Wf^2$ (phase to phase terminal resistance)

$Kt=Kt_0*Wf$ (motor torque constant)

$Ke=Ke_0*Wf$ (motor back EMF voltage constant)

where $Rw_0$, $Kt_0$, and $Ke_0$ represent an initial design point. Using these relationships, a standard motor can be rewound for a large range of PWM duty cycles to supply a given torque. Though the peak current drawn from the supply voltage 12 in order to generate the given torque is always proportional, to the current in the motor windings, the average power drawn from the supply voltage 12 over any given duty cycle is always constant regardless of how the motor is wound.

Figure 2C:
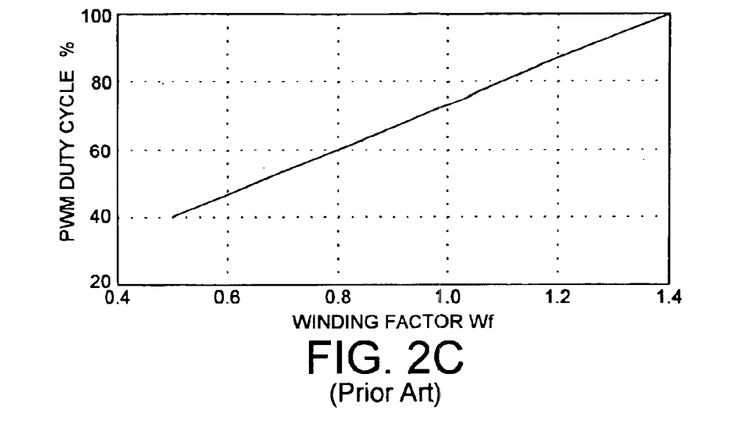
FIG. 2C shows a conventional relationship between the duty cycle of a PWM signal modulating the supply voltage and a winding factor Wf of the spindle motor windings.
Figure 2D:
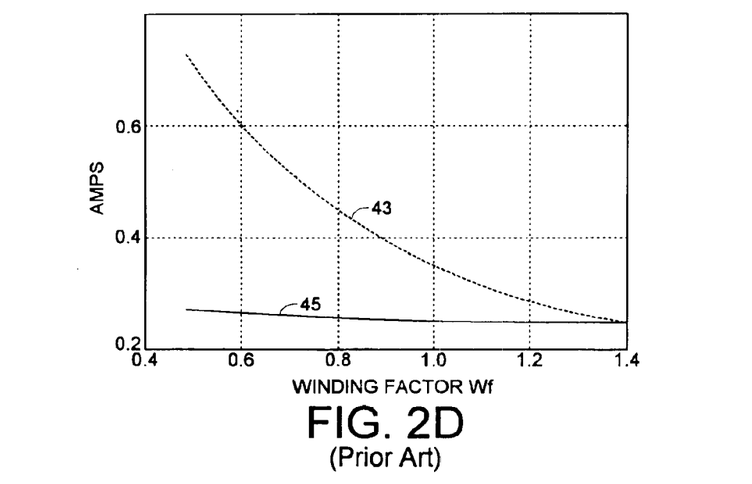
FIG. 2D shows a conventional relationship of the peak current in the spindle motor windings and the average current drawn from the supply voltage relative to the winding factor Wf.

A conventional configuration results in the relationship between the duty cycle of PWM signal 42 and the winding factor Wf shown in FIG. 2C. As illustrated, to produce a given torque the duty cycle of PWM signal 42 must increase as the winding factor Wf increases in order to increase the average voltage applied to the windings. FIG. 2D shows the relationship of the peak current 43 in the spindle motor windings and the average current 45 drawn from the supply voltage 12 relative to the winding factor Wf. As illustrated, for a given torque the peak current 43 in the motor windings decreases as Wf increases whereas the average current 45 drawn from the supply voltage 12 remains relatively constant.

If a secondary supply voltage is connected to the center tap 18 as disclosed in the above-referenced patent application entitled "DISK DRIVE COMPRISING A MULTI-PHASE SPINDLE MOTOR HAVING A CENTER TAP CONNECTABLE TO A SECONDARY SUPPLY VOLTAGE", the possibility exists of exchanging current between the primary and secondary supply voltages through the center tap 18. The resulting circuit can be considered as two separate inductors, one pulling current from the secondary supply voltage and the other dumping current from the primary supply voltage 12 back into the secondary supply voltage. Since the current in the winding φB connected to the primary supply voltage 12 is controlled by PWM signal 42, we can add or subtract current through this winding to control speed, even though a constant current is being drawn from the secondary supply voltage. The average current operating point is set by the resistance of the windings and the average back EMF voltage, which in turn are established by the winding factor Wf according to the above relationships.

Winding the spindle motor with fewer turns reduces the resistance in each winding as well as the run speed back EMF voltage, thereby increasing the peak current drawn from the secondary supply voltage. Conversely, winding the spindle motor with more turns increases the resistance in each winding as well as the run speed back EMF voltage, thereby decreasing the peak current draw from the secondary supply voltage. The torque generated by the spindle motor also affects the amount of current drawn from the supply voltages. The torque applied to the load is adjusted by adjusting the duty cycle of PWM signal 42 in a manner similar to the conventional control technique (current is sourced from the primary supply voltage 12 and from the secondary supply voltage).

Figure 2E:
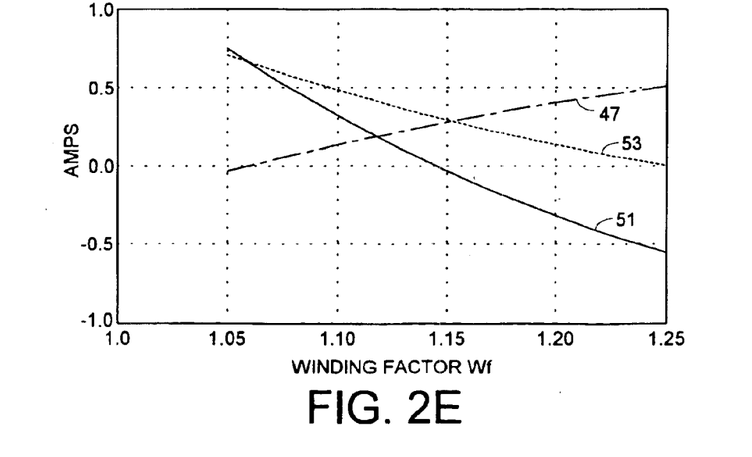
FIG. 2E shows the relationship between the current drawn from a primary and secondary supply voltages (as well as the corresponding currents in the windings) and the winding factor Wf for a typical load torque when a secondary supply voltage is connected to the center tap of the spindle motor.

FIG. 2E shows the relationship between the average current 47 drawn from the primary supply voltage 12 and the winding factor Wf when using a high duty cycle for a typical load torque. FIG. 2E also shows the relationship between the average current 51 drawn from the secondary supply voltage (as well as the related average current 53 in the winding φC) and the winding factor Wf when using a high duty cycle for a typical load torque. For example, at a winding factor Wf of 1.05, the secondary supply voltage provides 0.75 amps of run current, while the primary supply voltage 12 provides essentially no current. Under these circumstances, all the current from the primary supply voltage 12 is available for the VCM 8, allowing for faster seeks without violating the primary supply voltage 12 peak current envelope.

If the winding factor Wf is raised to 1.15, the secondary supply voltage provides essentially no current, while the primary supply voltage 12 provides nearly 0.3 amps. At this point, the 0.3 amps in winding φB produces the proper voltage at the center tap 18 to match the secondary supply voltage. The 0.3 amps passes through winding φC to ground, and the secondary supply voltage contributes net zero current. This arrangement is equivalent to a conventional configuration wherein the spindle motor is driven only by the primary supply voltage 12.

If the winding factor Wf is raised to 1.25, the current in winding φC still matches the current in winding φB because the back EMF is about equal to secondary supply voltage. However, the primary supply voltage 12 now provides all the current to drive the spindle motor, and an additional 0.5 amps is dumped from the primary supply voltage 12 and returned to the secondary supply voltage (the secondary voltage 58). This allows current to be drawn from the primary supply voltage 12 through the center tap 18 to power the control circuitry in the disk drive.

Figure 2F:
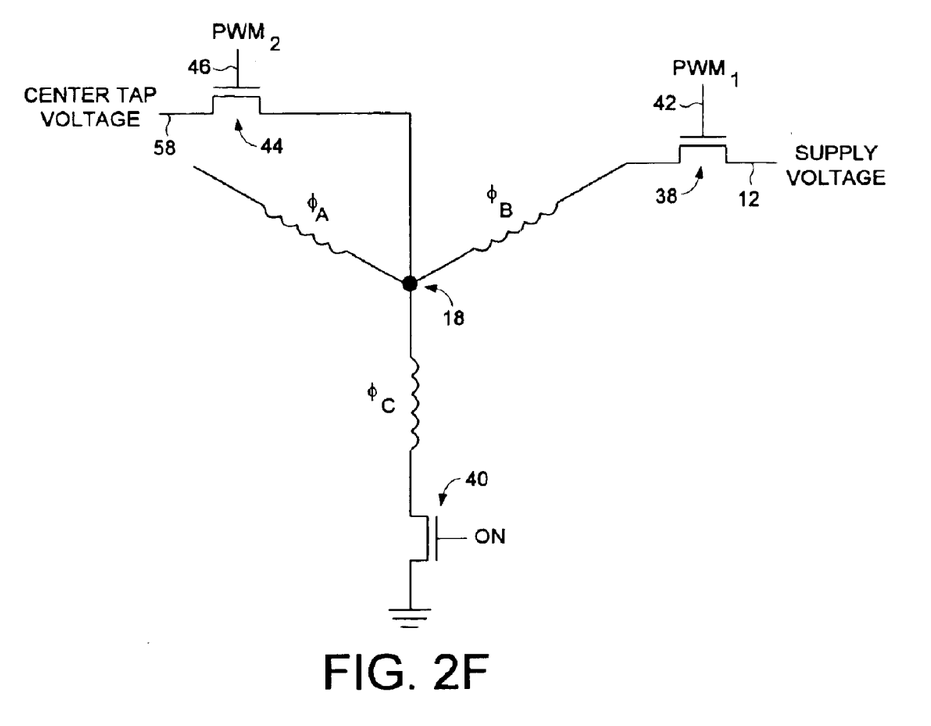
FIG. 2F shows a spindle motor configuration according to an embodiment of the present invention comprising a switch modulated to control the secondary voltage supplied by the center tap of the windings.

In another embodiment shown in FIG. 2F, the center tap 18 of the windings is connected to the voltage regulator 60 through a switch 44 pulse width modulated by PWM signal 46 in order to control the secondary voltage 58 supplied by the center tap 18 of the windings. In one embodiment the PWM signals 42 and 46 are controlled independently, and in another embodiment, the PWM signals 42 and 44 are controlled dependently (and may be the same signal).

Figure 3:
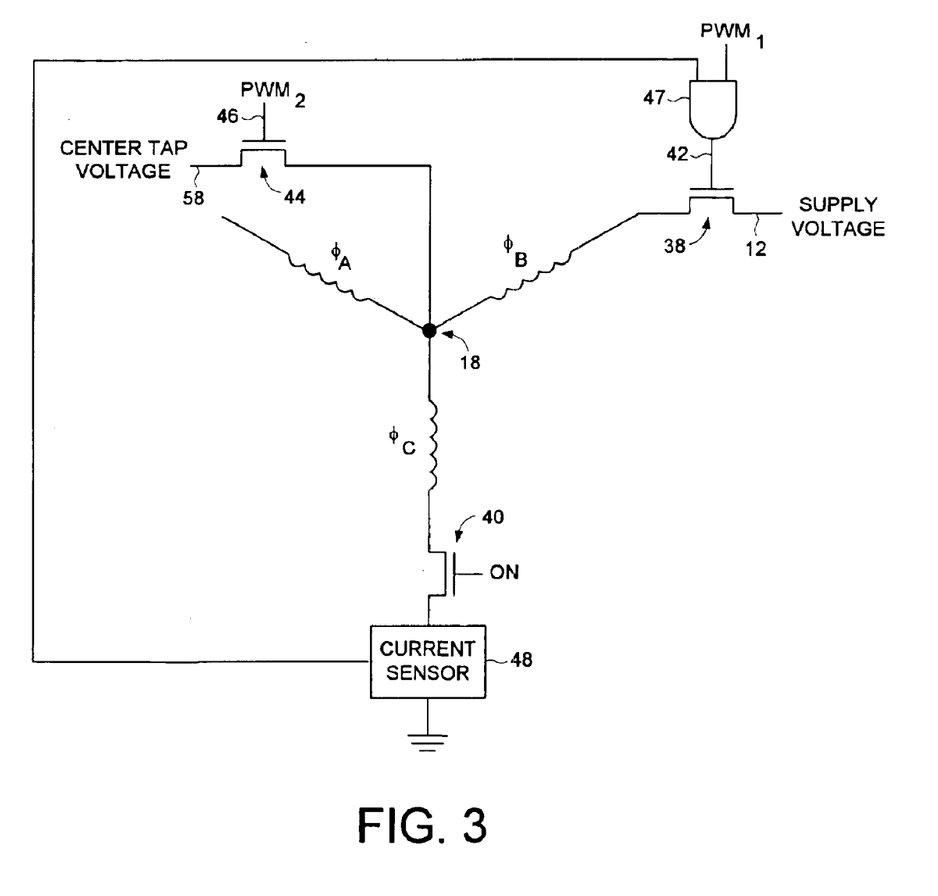
FIG. 3 shows a spindle motor configuration according to an embodiment of the present invention comprising a current sensor for sensing a magnitude of the current passing through the windings, wherein the supply voltage is disconnected from the windings if the magnitude of the sensed current is greater than a threshold.

In another embodiment shown in FIG. 3 a current sensor 48 senses a current passing through the lower winding φC. The PWM signal 42 modulating the supply voltage 12 is disabled through AND gate 47 to disconnect the supply voltage 12 from the top winding φB while the sensed current in the lower winding φC is greater than a threshold. Suitable circuitry for implementing the current sensor 48 is disclosed in the above-referenced patent application entitled "DISK DRIVE COMPRISING SPIN DOWN CIRCUITRY HAVING A POWER CLAMP CIRCUIT FOR ENHANCING POWER AND BRAKING CONTROL".

Figure 4A:
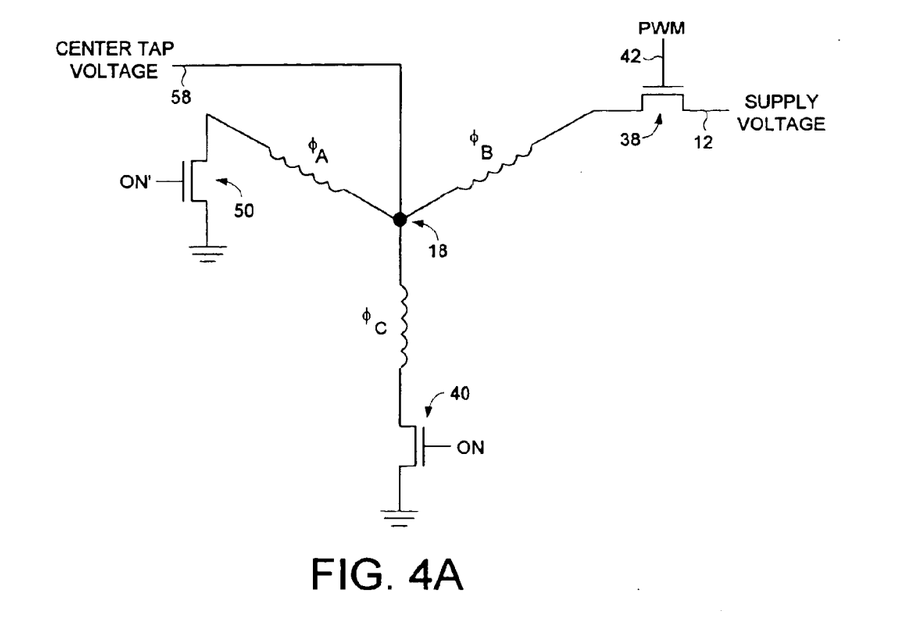
FIG. 4A shows a spindle motor configuration according to an embodiment of the present invention wherein two windings are grounded during part of a commutation interval to control the secondary voltage supplied by the center tap of the windings.
Figure 5A:
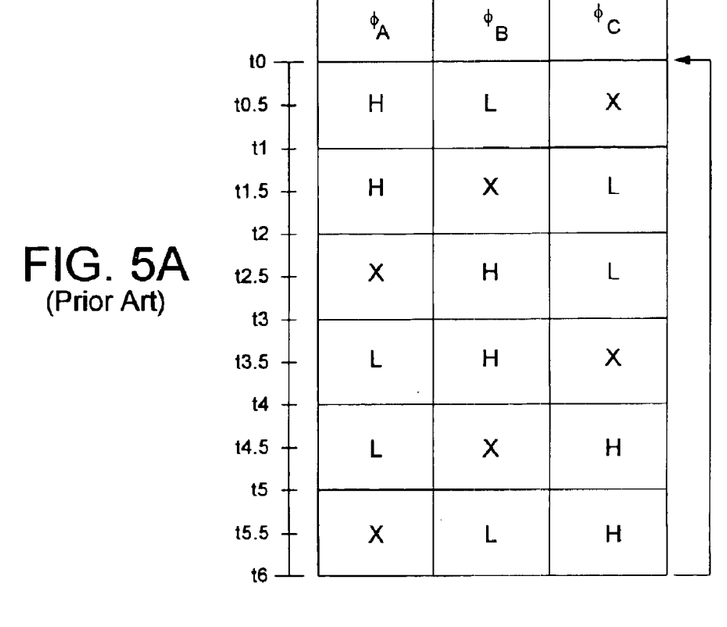
FIG. 5A shows a prior art commutation sequence wherein two phases of a three phase spindle motor are driven during each commutation interval.
Figure 5B:
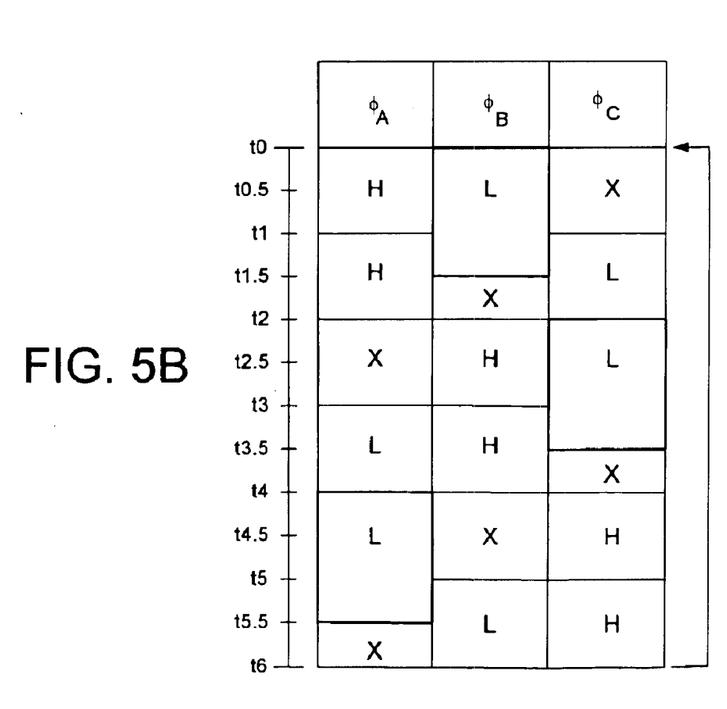
FIG. 5B shows a commutation sequence according to an embodiment of the present invention wherein the "ON" period of the low side driver is extended so that two of the windings are grounded during at least part of a commutation interval to control the secondary voltage supplied by the center tap of the windings.

FIG. 4A shows a commutation interval for the spindle motor according to an embodiment of the present invention wherein the third winding φA is grounded during part of the commutation interval to control the secondary voltage 58 supplied by the center tap 18 of the windings. While the third winding φA is grounded it is in parallel with the second winding φC which reduces the resistance by half relative to the secondary voltage 58. FIG. 5A shows a conventional bipolar commutation sequence wherein during each commutation interval a first winding is connected to the supply voltage 12 (designated H), a second winding is grounded (designated L), and the third winding is floating (designated X). At the end of each commutation interval the connections are switched as shown in FIG. 5A, and after six commutation intervals the commutation sequence is repeated. FIG. 5B shows an embodiment of the present invention wherein the conventional commutation sequence of FIG. 5A has been modified so that the winding that was grounded during a previous commutation interval remains grounded for part of the next commutation interval, thereby grounding two of the windings for at least part of the next commutation interval.

Figure 4B:
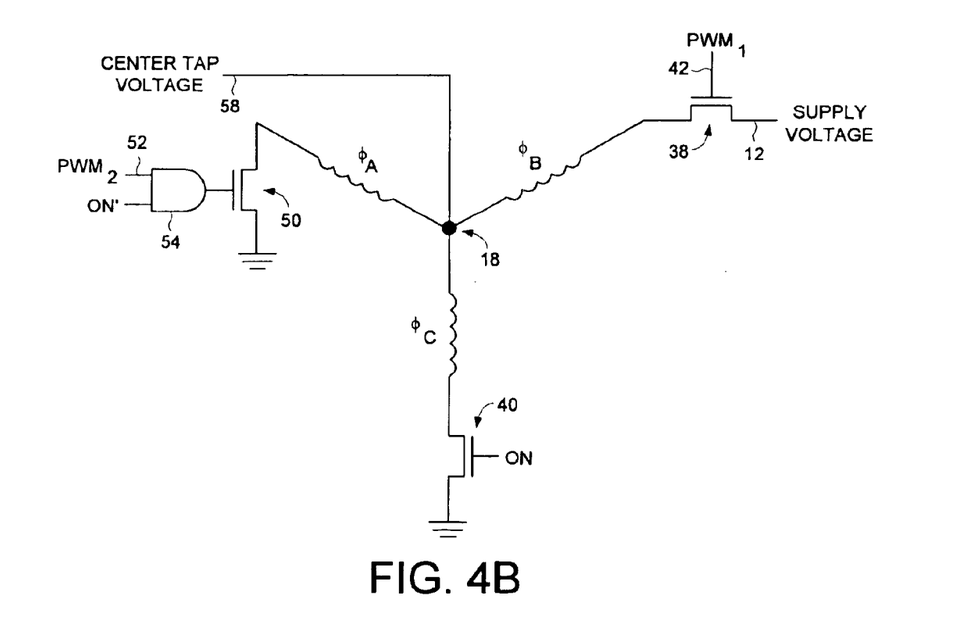
FIG. 4B shows a spindle motor configuration according to an embodiment of the present invention wherein one of the two windings is grounded by a modulation signal to control the secondary voltage supplied by the center tap of the windings.

In one embodiment, the part of the commutation interval wherein the two windings are grounded varies in order to control the secondary voltage 58 supplied by the center tap 18 of the windings. Referring again to FIG. 4A, during the commutation interval shown the commutation logic 22 (FIG. 1) controls the time that switch 50 remains on while holding switch 40 on for the entire commutation interval. During the commutation sequence two of the windings may be grounded for varying time periods (e.g., from zero to a full commutation interval). In another embodiment shown in FIG. 5B, during the commutation sequence two of the windings are grounded for a constant fraction of a commutation interval (e.g., ½ a commutation interval) and the secondary voltage 58 supplied by the center tap 18 is controlled by modulating switch 50 with a PWM signal 52 through AND gate 54 as shown in FIG. 4B. The amount of current drawn from the supply voltage 12 through the center tap 18 depends on the duty cycle of the third phase switch 50, the duty cycle of the center tap switch if one is present, the winding factor Wf of the motor, and the presence, magnitude and phase of back EMF voltages in the spindle motor 16.

We claim:

1. A disk drive comprising:
   (a) a disk comprising a plurality of tracks;
   (b) a head;
   (c) a voice coil motor for actuating the head radially over the disk;
   (d) an interface for receiving a supply voltage from a host computer;
   (e) a multi-phase spindle motor for rotating the disk, the multi-phase spindle motor comprising a plurality of windings, each winding comprising a first end and a second end, the second ends connected together at a center tap;
   (f) a spindle driver, responsive to the supply voltage, for commutating the windings over commutation intervals during a normal operating mode of the disk drive; and
   (g) control circuitry for controlling at least one operation of the disk drive, wherein:
      a secondary voltage is supplied by the center tap of the windings; and
      the control circuitry is powered by the secondary voltage during the normal operating mode.

2. The disk drive as recited in claim 1, further comprising a voltage regulator for regulating the secondary voltage used to power the control circuitry during the normal operating mode.

3. The disk drive as recited in claim 1, wherein the windings are wound to control the secondary voltage supplied by the center tap of the windings.

4. The disk drive as recited in claim 2, wherein the center tap is connected directly to the voltage regulator.

5. The disk drive as recited in claim 2, further comprising a switch for connecting the center tap to the voltage regulator, wherein the switch is modulated to control the secondary voltage supplied by the center tap of the windings.

6. The disk drive as recited in claim 1, wherein the spindle driver connects the first end of a first one of the windings and the first end of a second one of the windings to ground for at least part of a commutation interval in order to control the secondary voltage supplied by the center tap of the windings.

7. The disk drive as recited in claim 6, wherein the interval that the first end of the second one of the windings is connected to ground varies in order to control the secondary voltage supplied by the center tap of the windings.

8. The disk drive as recited in claim 6, wherein the spindle driver is responsive to a modulation signal for modulating the connection of the first end of the second one of the windings to ground for at least part of the commutation interval in order to control the secondary voltage supplied by the center tap of the windings.

9. A method of operating a disk drive, the disk drive comprising a disk having a plurality of tracks, a head, a voice coil motor for actuating the head radially over the disk, an interface for receiving a supply voltage from a host computer, control circuitry for controlling at least one operation of the disk drive, and a multi-phase spindle motor for rotating the disk, the multi-phase spindle motor comprising a plurality of windings, each winding comprising a first end and a second end, the second ends connected together at a center tap, the method comprising the steps of:
   (a) commutating the windings over commutation intervals in response to the supply voltage during a normal operating mode;
   (b) generating a secondary voltage from the center tap of the windings; and
   (c) using the secondary voltage to power the control circuitry during the normal operating mode.

10. The method as recited in claim 9, further comprising the step of regulating the secondary voltage used to power the control circuitry during the normal operating mode.

11. The method as recited in claim 9, wherein the windings are wound to control the secondary voltage generated from the center tap of the windings.

12. The method as recited in claim 9, farther comprising the step of connecting the first end of a first one of the windings and the first end of a second one of the windings to ground for at least part of a commutation interval in order to control the secondary voltage generated from the center tap of the windings.

13. The method as recited in claim 12, further comprising the step of varying the interval that the first end of the second one of the windings is connected to ground in order to control the secondary voltage generated from the center tap of the windings.

14. The method as recited in claim 12, further comprising the step of modulating the connection of the first end of the second one of the windings to ground for at least part of the commutation interval in order to control the secondary voltage generated from the center tap of the windings.

* * * * *